United States Patent
Wu et al.

(10) Patent No.: US 8,012,895 B2
(45) Date of Patent: Sep. 6, 2011

(54) SEALING MATERIAL FOR SOLID OXIDE FUEL CELLS

(75) Inventors: Szu-Han Wu, Taoyuan County (TW); Kin-Fu Lin, Taoyuan County (TW); Ruey-Yi Lee, Taoyuan County (TW); Chien-Kuo Liou, Taoyuan County (TW); Tung-Yuan Yang, Taoyuan County (TW); Tzann-Sheng Lee, Taoyuan County (TW); Li-Chun Cheng, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 616 days.

(21) Appl. No.: 12/204,230

(22) Filed: Sep. 4, 2008

(65) Prior Publication Data

US 2009/0061282 A1    Mar. 5, 2009

(30) Foreign Application Priority Data

Sep. 4, 2007   (TW) ............................. 96132815 A

(51) Int. Cl.
C03C 3/093   (2006.01)
C03C 3/068   (2006.01)
C03C 3/00    (2006.01)
H01M 2/00    (2006.01)

(52) U.S. Cl. ............... 501/67; 501/15; 501/20; 501/18; 429/469; 428/426

(58) Field of Classification Search .......... 501/67, 501/15, 20, 18; 429/469; 428/426
See application file for complete search history.

(56) References Cited

U.S. PATENT DOCUMENTS

| 6,607,864 B2 * | 8/2003 | Serizawa et al. ......... 430/123.52 |
| 6,933,674 B2 * | 8/2005 | Im et al. ......................... 313/582 |
| 2005/0147866 A1 * | 7/2005 | Ko et al. ......................... 429/36 |
| 2006/0019813 A1 * | 1/2006 | Yoshii ............................. 501/15 |

FOREIGN PATENT DOCUMENTS

| EP | 2053026 A1 * | 4/2009 |
| JP | 04046035 A * | 2/1992 |
| WO | WO 9736836 A1 * | 10/1997 |
| WO | WO 2005050751 A2 * | 6/2005 |

OTHER PUBLICATIONS

Piao Jinhua et al., "Sealing Glass of Barium-Calcium-Aluminosilicate System for Solid Oxide Fuel Cells", Journal of Rare Earths, 25 (2007), 434-438.*
Jurgen Malzbender et al., "Symmetric shear test of glass-ceramic sealants of SOFC operation temperature", J. Mater. Sci., (2007) 42, 6297-6301.*
Peng Lian et al., "Thermal Stability Investigation of a Newly Developed Sealing Glass as IT-SOFC Sealant", Journal of Inorganic Materials, 2006, 21, 4, 867-872.*
Piao J et al., "Application of Glass Sealant for SOFC", Journal of Rare Earths, 22 (2004), 77-80 (Abstract Only).*
Zhenguo Yang et al., "Chemical Stability of Glass Seal Interfaces in Intermediate Temperature Solid Oxide Fuel Cells", Journal of Materials Engineering and Performance, (2004) 13, 327-334.*
Piao J et al., "Application of Glass Sealant for SOFC", Journal of Rare Earths, 22 (2004), 77-80.*

* cited by examiner

*Primary Examiner* — Douglas Mc Ginty
(74) *Attorney, Agent, or Firm* — WAPT, PC; Justin King

(57) ABSTRACT

A sealing material for solid oxide fuel cells is provided, which is composed of around 60% to 80% by weight of glass, around 20% to 30% by weight of alcohol, around 0.5% to 3% by weight of ethyl celluloid as a binder, and around 0.01% to 0.1% by weight of polyethylene glycol as a plasticizer.

4 Claims, 4 Drawing Sheets

SEALING MATERIAL FOR SOLID OXIDE FUEL CELLS

BACKGROUND OF THE INVENTION

1. Field of Invention

The present invention relates to a sealing material for solid oxide fuel cells, especially for a sealing material, which can harden quickly at a room temperature without a baking step, for solid oxide fuel cells.

2. Related Art

A solid oxide fuel cell (SOFC) is expected as one of the best prospect green energy in this century, and it has several characteristics of high efficiency, friendly for the environment, quiet, and good reliability, etc. Compared to tubular and mono-block layer built (MOLB) type solid oxide fuel cells, a planar solid oxide fuel cell has benefits of short current flow path, uniform collection, and high power density of cells. Therefore, the planar solid oxide fuel cell is always a main object of solid oxide fuel cells to be researched and developed.

Since there are a fuel gas (hydrogen, anode) and an oxidation gas (oxygen, cathode) existing around both sides of an electrolyte while the planar solid oxide fuel cell is working, a sealing material is needed to separate anode and cathode working chambers and provide sealing performance. In a sealing process, the sealing material should be fully soaked and adhered with the bipolar plates and the electrolyte to achieve the sealing performance. Meanwhile, the sealing material and the materials contacting with it should keep thermal matching, chemical stability, dimensional stability, and electrical isolation in an oxidation reduction atmospheres to guarantee the sealing performance could be kept for a long time. Because of the strict requirement of performance, finding appropriate sealing materials is always a tough technological point for developing the planar solid oxide fuel cell.

It is a trend to develop intermediate temperature (600° C. to 850° C.) planar solid oxide fuel cells. There are many reports about nucleated glass utilized in high temperature (1000° C.) solid oxide fuel cells for sealing before. However, there are still short of reports about sealing materials for the intermediate temperature planar solid oxide fuel cells.

For the intermediate temperature planar solid oxide fuel cell adopting metal bipolar plates, low melting glass is usually chosen as a sealing material. Besides silicon, the glass is composed of a large quantity of alkaline metal oxide and alkaline earth metal oxide. These compositions would move in a fuel cell system easily and react with other fuel cell components. Therefore, for the planar solid oxide fuel cells, technical researchers do a lot of job to develop the sealing materials which can match these fuel cell components. Research works are focused on alkaline metal silicates, alkaline earth metal silicates, alkaline metal boron silicate glass, or glass-ceramics such as Pyrex glass and aluminum phosphates. Nevertheless, various materials have defects that thermal expansion coefficients do not match and stabilities for long term operation are poor for example.

Therefore, the inventors of the present invention design a sealing material for fuel cells to solve the above problems.

SUMMARY OF THE INVENTION

In view of the above problems, an object of the present invention is to provide a sealing material for solid oxide fuel cells which can harden quickly at room temperature without a high temperature baking step and achieve strength, dimensional, and chemical stabilities.

According to one embodiment of the present invention, a sealing material for solid oxide fuel cells is provided, which comprises around 60% to 80% by weight of glass, around 20% to 30% by weight of alcohol, around 0.5% to 3% by weight of ethyl celluloid as a binder, and around 0.01% to 0.1% by weight of polyethylene glycol as a plasticizer.

Preferably, the glass comprises around 20% to 40% by weight of silicon dioxide, around 5% to 15% by weight of boron oxide, around 20% to 40% by 7weight of barium oxide, around 1% to 7% by weight of aluminum oxide, around 3% to 20% by weight of calcium oxide, around 1% to 10% by weight of lanthanum oxide, and around 0.1% to 2% by weight of zirconium oxide.

Preferably, the alcohol is polybasic alcohol.

Preferably, the alcohol is ethyl alcohol.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

The features and practice of the present invention will be illustrated below in detail through preferred embodiments with reference to the accompanying drawings.

<<Step 1: Preparation of Glass-Ceramic>>

Firstly, a glass-ceramic powder is prepared by referring to an international formula of glass-ceramic powder. The glass-ceramic powder designed according to the present invention comprises around 20% to 40% by weight of silicon dioxide, around 5% to 15% by weight of boron oxide, around 20% to 40% by weight of barium oxide, around 1% to 7% by weight of aluminum oxide, around 3% to 20% by weight of calcium oxide, around 1% to 10% by weight of lanthanum oxide, and around 0.1% to 2% by weight of zirconium oxide.

After the materials of the above formula are mixed together according to each proportion, they are put in an agate jar for grinding 200 minutes to become powder and be fully mixed together. Then, the powder is put in a platinum crucible and heated from a room temperature to around 1500° C. to 1600° C. at a rate of 5° C. per minute, and the temperature of 1500° C. to 1600° C. is kept for 4 hours, so as to generate a fusion effect, and then the glass-ceramic of the present invention is obtained. After cooling, the glass-ceramic is taken out from the platinum crucible and ground by a ball mill to become micron powder, and then the powder with a standard granularity is sieved out from a screen machine.

<<Step 2: Manufacture of a Sealing Material of Glass>>

Figure 1:
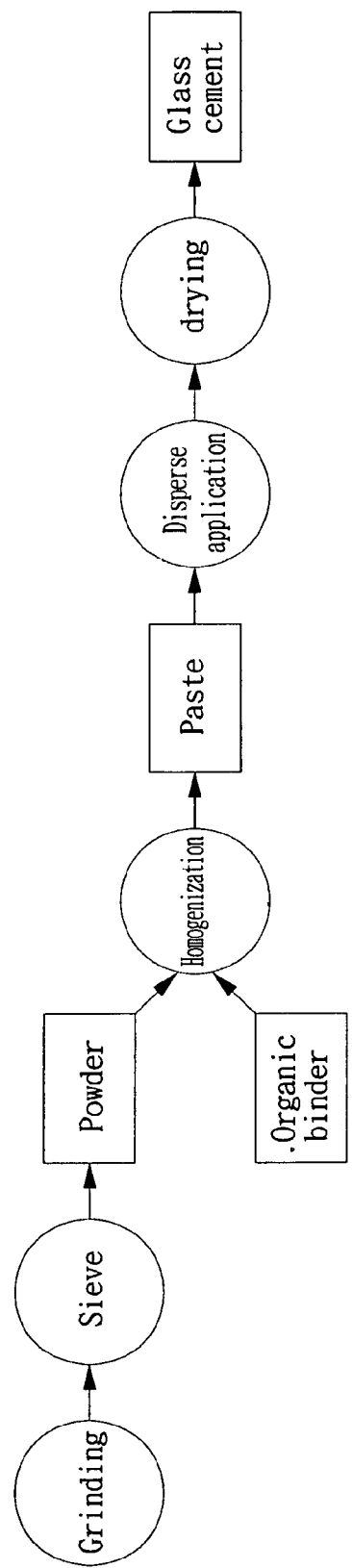
FIG. 1 is a manufacturing flow chart of a sealing material for solid oxide fuel cells according to the present invention.

Around 20% to 30% by weight of alcohol (e.g., ethyl alcohol or polybasic alcohol), around 0.5% to 3% by weight of binder (e.g., ethyl celluloid), and around 0.01% to 0.1% by weight of plasticizer (e.g., polyethylene glycol (PEG) ) are taken and mixed, and they are stirred by a magnet and heated at 75° C. until becoming a transparent liquid. Afterward around 60% to 80% by weight of glass-ceramic prepared by step 1 is taken and added into the above transparent liquid, and then the transparent liquid is placed in a mixer machine to be stirred for 2 minutes at a spin rate of 1600 cycles per minute and then for 2 minutes at a spin rate of 1800 cycles per minute for debubbling. Afterward the well mixed sealing material of glass is obtained, and its best advantage is that it could harden quickly at a room temperature without a baking step. A complete flow chart of the step 1 and 2 is shown in FIG. 1.

<<Thermal Expansion Performance Test of the Sealing Material of Glass>>

Figure 2:
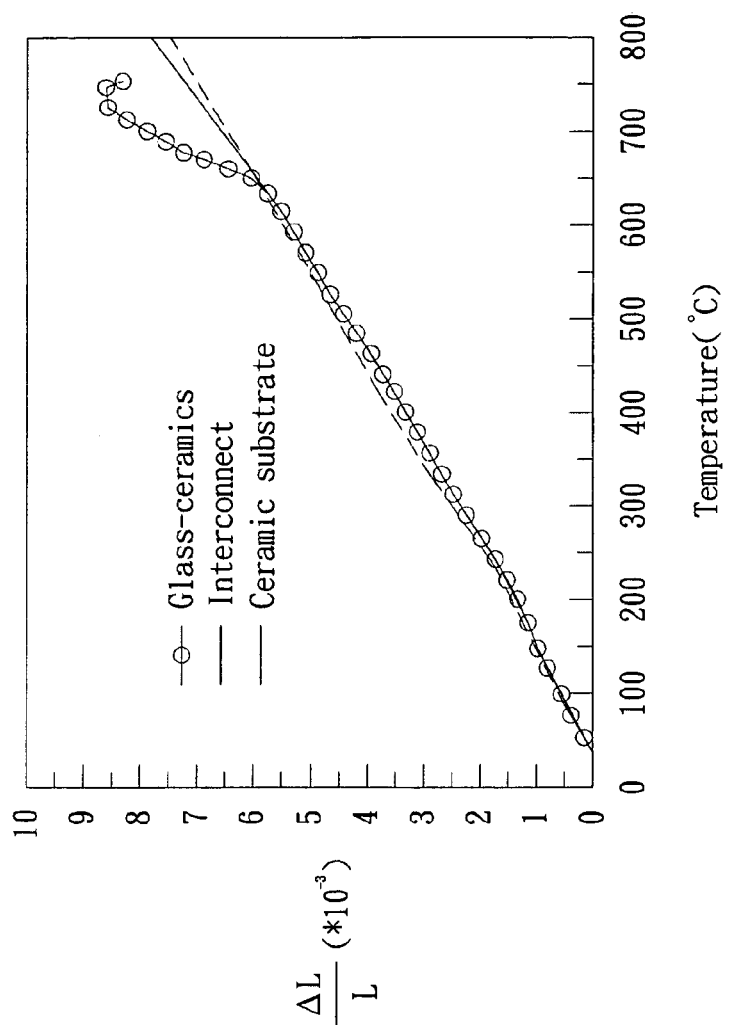
FIG. 2 is a relationship diagram of length and temperature of a thermal expansion test of the sealing material for solid oxide fuel cells according to the present invention.

During an experiment, around 16 millimeters of the sealing material of glass-ceramic, a metal interconnect, and a ceramic substrate are cut into test specimens and a thermal expansion test is performed by using a thermal dilatometer SETARAM DHT 2405, and the test result is shown in FIG. 2, which shows thermal expansion coefficients of the sealing material of glass-ceramic, the metal interconnect, and the ceramic substrate. According to the result, the thermal expansion coefficient of the sealing material of the present invention is around $9.48 \times 10^{-6}/°$ C. In addition, when the temperature is below 650° C., the thermal expansion coefficient of the sealing material around $10 \times 10^{-6}$ m/m/° C. is very similar with that of the metal interconnect and the ceramic substrate. However, at 650° C., the metal interconnect may occur phase change and its thermal expansion coefficient is raised suddenly. At 750° C., thermal expansion coefficients of the metal interconnect and the ceramic substrate respectively are around $12.6 \times 10^{-6}$ m/m/° C. and $10.2 \times 10^{-6}$ m/m/° C. At such a high temperature condition, the consistency of the thermal expansion coefficients of the metal interconnect and the ceramic substrate is hard to be achieved. In this moment, the glass-ceramic which possesses bondability at the high temperature is utilized to complement the difference.

<<Microcosmic Structure and Morphology of Sealing Interface>>

In addition, a scanning electron microscope (SEM) is utilized for observing a microcosmic structure and morphology of a specimen to confirm a bonding condition of the sealing material with an electrolyte (e.g., yttria stabilized zirconia, YSZ). After observing, it could be understood that a thickness of a sealing material layer is uniform, the sealing material and the electrolyte are connected very well, and the sealing material is quite dense without any cavity.

<<Leakage Rate Test of the Sealing Material of Glass>>

Figure 3:
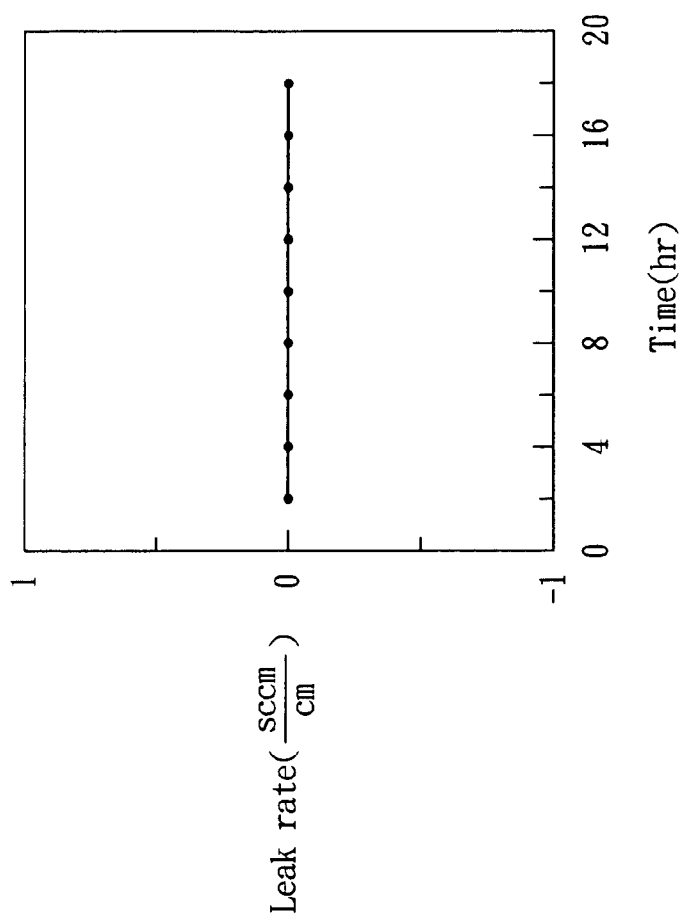
FIG. 3 is a relationship diagram of leakage and time of a leakage rate test of the sealing material for solid oxide fuel cells according to the present invention.
Figure 4:
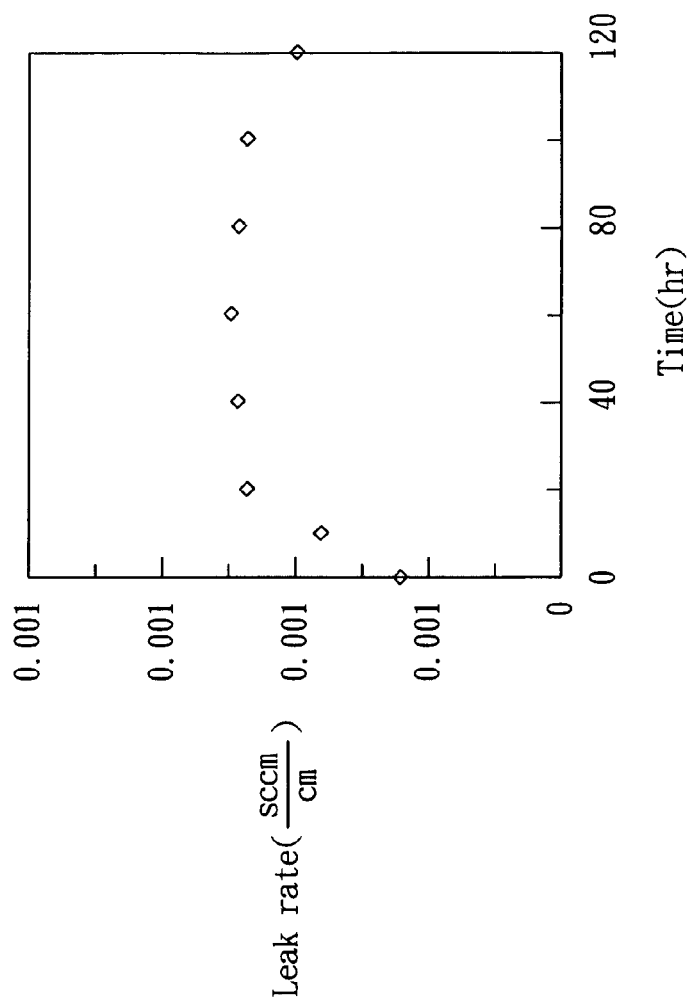
FIG. 4 is a relationship diagram of leakage and time of another leakage rate test of the sealing material for solid oxide fuel cells according to the present invention

During a leakage rate test of the sealing material of glass, a sealing material of glass is coated on a Crofer 22 substrate of 6×6 centimeters at a coating speed of 6 millimeters per second to form a test specimen. An iron ingot of 2.53 kilograms is placed on the test specimen. Through a high temperature (850° C.) sealing, a 0.5 millimeter thick ceramic spacer is placed between two test specimens to avoid the sealing material spreading, and then a test is performed at a pressure of 2.0 pounds per square inch. A helium gas with pressure of 2.0 pounds per square inch is filled at a normal temperature, and it is discovered that the pressure is not changed as shown in FIG. 3. As shown in FIG. 4, similarly, The helium gas with pressure of 2.0 pounds per square inch is filled at temperature of 800° C. for a long time, it is discovered that a leakage rate maintains 1 to $3 \times 10^{-3}$ sccm/cm.

As mentioned above, the sealing material of the present invention has a very good reliability without a high temperature baking step. It is an unprecedented technology in the field of fuel cells.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sealing material for solid oxide fuel cells, comprising:
   60% to 80% by weight of glass;
   20% to 30% by weight of alcohol;
   0.5% to 3% by weight of ethyl celluloid as a binder; and
   0.01% to 0.1% by weight of polyethylene glycol as a plasticizer.

2. The sealing material for solid oxide fuel cells as claimed in claim 1, wherein the glass comprising:
   20% to 40% by weight of silicon dioxide;
   5% to 15% by weight of boron oxide;
   20% to 40% by weight of barium oxide;
   1% to 7% by weight of aluminum oxide;
   3% to 20% by weight of calcium oxide;
   1% to 10% by weight of lanthanum oxide; and
   0.1% to 2% by weight of zirconium oxide.

3. The sealing material for solid oxide fuel cells as claimed in claim 1, wherein the alcohol is polybasic alcohol.

4. The sealing material for solid oxide fuel cells as claimed in claim 1, wherein the alcohol is ethyl alcohol.

* * * * *